United States Patent [19]

Fenwick et al.

[11] Patent Number: 4,947,244
[45] Date of Patent: Aug. 7, 1990

[54] VIDEO SELECTION AND DISTRIBUTION SYSTEM

[75] Inventors: Robert B. Fenwick, Los Altos Hills; Larry L. Peden, Monte Sereno; Robert Snyder; John W. McMains, both of Saratoga; Jeffrey R. Gile, San Mateo, all of Calif.

[73] Assignee: On Command Video Corporation, Santa Clara, Calif.

[21] Appl. No.: 346,778

[22] Filed: May 3, 1989

[51] Int. Cl.$^5$ .......................................... H04N 7/167
[52] U.S. Cl. .......................................... 358/86; 455/5; 380/5; 380/10
[58] Field of Search .................... 358/86; 455/4, 5; 380/5, 10

[56] References Cited

U.S. PATENT DOCUMENTS

| | | | |
|---|---|---|---|
| 4,077,006 | 2/1978 | Nicholson | 358/86 |
| 4,381,522 | 4/1983 | Lambert | 358/86 |
| 4,439,784 | 3/1984 | Furukawa et al. | 455/4 |
| 4,450,477 | 5/1984 | Lovett | 455/5 |
| 4,455,570 | 6/1984 | Saeki et al. | 455/5 |
| 4,506,387 | 3/1985 | Walter | 358/86 |
| 4,567,512 | 1/1986 | Abraham | 358/86 |
| 4,573,072 | 2/1986 | Freeman | 358/86 |
| 4,598,288 | 7/1986 | Yarbrough et al. | 358/349 |
| 4,734,764 | 3/1988 | Pocock et al. | 358/86 |
| 4,740,834 | 4/1988 | Mobarry | 358/86 |
| 4,835,604 | 5/1989 | Kondo et al. | 358/86 |
| 4,890,319 | 12/1989 | Seth-Smith et al. | 380/5 |
| 4,890,320 | 12/1989 | Monslow et al. | 380/10 |

FOREIGN PATENT DOCUMENTS

0081885 6/1983 European Pat. Off. ............ 358/86

Primary Examiner—Jin F. Ng
Assistant Examiner—Wing F. Chan
Attorney, Agent, or Firm—Flehr, Hohbach, Test, Albritton & Herbert

[57] ABSTRACT

A video distribution system transmits selected video programs to a number of independently controlled video monitors. The video monitors are arranged in groups, each group being coupled to a distinct transmission medium. A program selector associated with each video monitor generates video connection requests which specify a video source to be connected to that video monitor. A two stage video switch apparatus couples specified video sources to specified video monitors. The first stage routes specified video signals from the video sources to the second stage, which is a frequency multiplexer. The frequency multiplexer then transmits the specified video signals for each group of video monitors in distinct frequency bands on one of the transmission mediums. Each video monitor within each group of monitors has a tuner that is tuned to receive the video signal in a distinct one of the frequency bands. In effect, the transmission medium for each group of video monitors has a separate transmission channel for each of the monitors in the group. Finally, the system has a controller which receives the video connection requests, and controls the video switch apparatus so that it couples specified video sources to specified video monitors.

7 Claims, 10 Drawing Sheets

Comedy-Musical Movies

01 Airplane II: The Sequel
02 Beverly Hills Cop
03 Ghostbusters
04 Flashdance
05 Blazing Saddles
06 Little Shop of Horrors
07 Annie Hall
08 U2 Rattle & Hum
09 Beverly Hills Cop II

VIDEO SELECTION AND DISTRIBUTION SYSTEM

The present invention relates to video program distribution systems, and particularly to a system which enables users at remote video monitors to select and view any one of a large number of recorded video programs.

BACKGROUND OF THE INVENTION

The present invention is applicable to video systems for hospitals, schools, condominiums as well as hotels and other systems having a large number of independently controlled televisions or video monitors. For the purposes of illustrating and explaining the invention, however, the prior art and the preferred embodiment of the invention will be described in the context of a video system for a hotel.

Hotels often provide video program services beyond those available on publicly available television channels and publicly accessible cable television. The two main types of prior art systems are video tape rental systems and fixed schedule movie systems.

Hotels which use video tape rental systems install video tape players in each hotel room and rent video cassettes to the guests. The primary advantages of a video tape rental system is that the guest is provided with a large selection of movies, and may view his selected movie at any time that he pleases. Major disadvantages of this type of movie service include the requirement that the guest must leave his room in order to view a movie (or make a phone call and then wait for delivery), and loss of privacy due to the fact that the guest must reveal his choice of movie to the movie rental clerk and possibly other guests who are renting movies at the same time.

Currently, the type of movie service provided by hotels most frequently consists of a fixed movie schedule of four to eight movies, usually on one to four different specially designated movie channels. Generally, all the rooms in the hotel have access to the same movie channels, allowing the entire hotel to operate from a single video cable (although repeaters and/or buffering circuitry are generally needed to service numerous rooms). The major advantages of fixed movie schedule systems are noninvasion of the guests' privacy, and the fact that guests do not need to leave their room (or wait for delivery of a movie cassette) in order to view a movie. A secondary advantage of this type of movie service, at least to the hotel, is that guests are automatically charged a fixed fee by the movie distribution system when a selected movie is viewed for more than a predefined period of time, typically around five minutes. The primary disadvantages of this type of movie service are that in order to view a selected movie, the hotel guests must conform their schedules to the scheduled viewings of the selected movie, and that the number of available movie titles is very limited.

SUMMARY OF THE INVENTION

It is a primary object of the present invention to provide an improved movie distribution system which combines the flexibility of video tape rental systems with the privacy and automated service features of fixed schedule movie systems.

Another object of the present invention is to provide hotel room occupants, and other users at remote video monitors, the ability to select and view any movie from a large library of such movies without having to leave their room and without needing to interact with a human attendant.

Yet another object of the present invention is to connect only one remote video monitor to each video movie source (e.g., a video tape player), so as to avoid illegal publication of video movies.

In summary, the present invention is a system and method for transmitting selected video programs to a number of independently controlled video monitors. The video monitors are arranged in groups, with each group being coupled to a distinct transmission cable. A program selector associated with each video monitor generates video connection requests which specify a video source that is to be connected to that video monitor.

A two stage video switch apparatus couples specified video sources to specified video monitors. The first stage routes video signals from the specified video sources to the second stage of the switch, which is a frequency modulator and multiplexer. The frequency modulator/multiplexer then transmits the specified video signals for each group of video monitors in distinct frequency bands on one of the transmission cables. Each video monitor within each group of monitors has a tuner that is tuned to receive the video signal in a distinct one of the frequency bands.

In effect, the transmission cable for each group of video monitors has a separate transmission channel for each of the monitors in the group. The video switch puts the selected program for each monitor in the proper frequency band of the transmission cable for that monitor. A central controller receives the video connection requests, and controls the video switch so that it couples the specified video sources to the specified video monitors.

When the video sources are video cassette players loaded with various movies and programs, the system can couple any selected one of the cassette players to a specified video monitor. As a result, the system temporarily provides the specified video monitor with a video cassette player for its own private use, with the advantage that the user can electronically select the program to be viewed instead of having to go somewhere to pick up a video cassette and bring it back to the video monitor (or call somewhere to have a video cassette delivered).

The video distribution system of the present invention can provide convenient and automatic video distribution to any system having a large number of independently controlled televisions or video monitors, such as a hotel, hospital, apartment building, condominium, or school.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
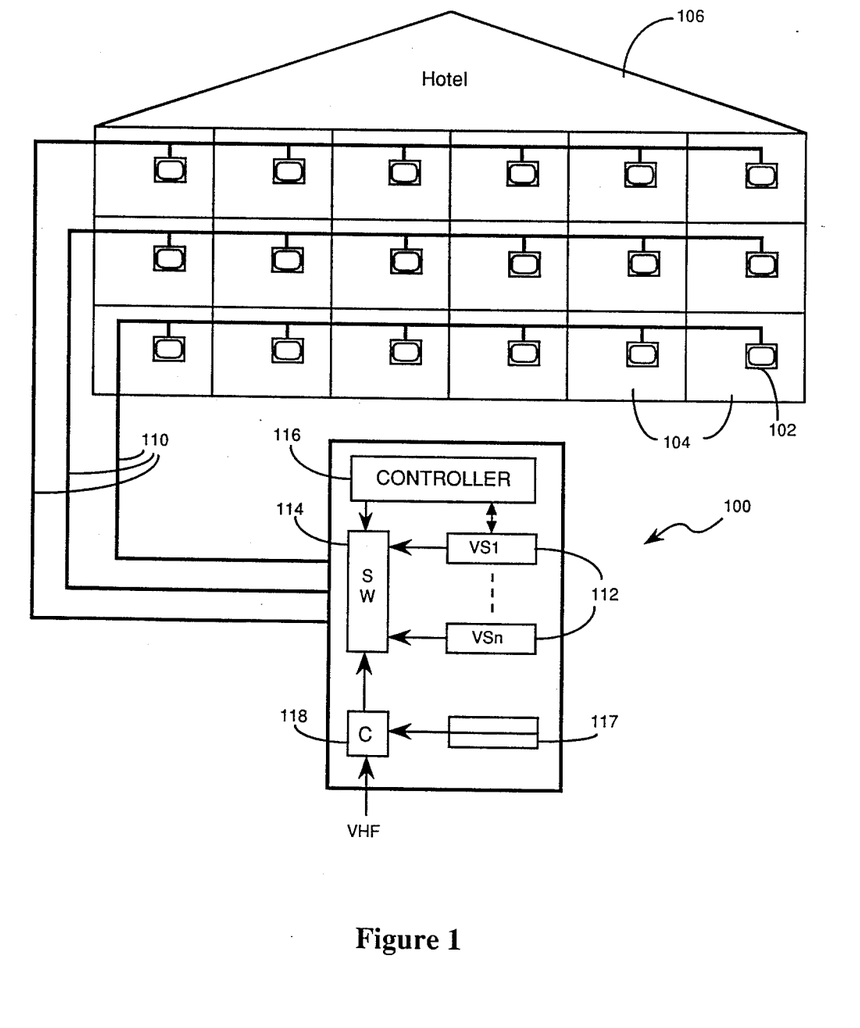
FIG. 1 is a block diagram of a hotel employing the video signal distribution system of the present invention.

Referring to FIG. 1, a video signal distribution system 100 in accordance with the present invention can be used to transmit selected programs to video monitors 102 in the various rooms 104 of a hotel 106. As shown in FIG. 1, the video monitors 102 are arranged in groups, with each group coupled to a separate transmission cable 110. While the video monitors in this example are divided into groups with a separate group for each floor of the hotel, any convenient division of the video monitors could be used.

The primary components of the system 100 are a set of audio-video sources (hereinafter "video sources") 112 and a video switch apparatus 114 which couples the video sources 112 to the video monitors 102 via the transmission cables 110. The video switch apparatus also retransmits standard VHF signals over the cables 110 so that the programming on the VHF channels can be received by the monitors.

A controller 116 is responsible for management of the system. It receives video connection requests from the users of the monitors 102, controls the switch 114, and generates menu displays which list the programs that are available to the users of the system.

As will be described in more detail below, two display images (called menus) used by the system are stored in screen buffers 117. These two display images are modulated for reception on channels 6 and 98, and are combined with the VHF signals for channels 2–5 and 7–13 (by a video combiner 118) for transmission to all of the video monitors 102 in the system.

Figure 2:
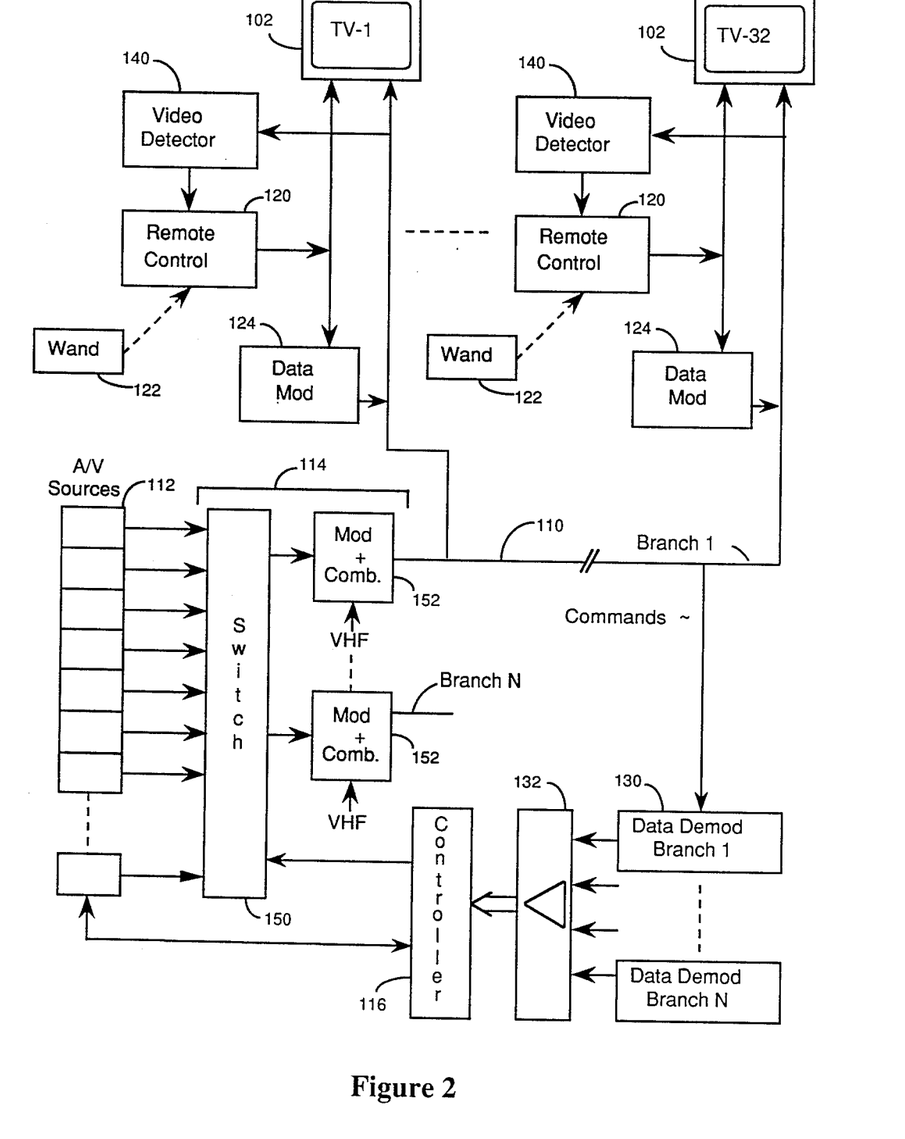
FIG. 2 is a block diagram of the circuitry of the preferred embodiment.

Referring to FIG. 2, there is shown a block diagram of the circuitry of the preferred embodiment. As shown in both FIGS. 1 and 2, the receiving portion of the system is divided into a number of branches, each of which has a number of monitors that are coupled to a common transmitting cable 110. In the preferred embodiment, each branch of the system can service up to thirty-two video monitors 102, and the number of branches which can be added to the system is virtually unlimited.

Figure 3:
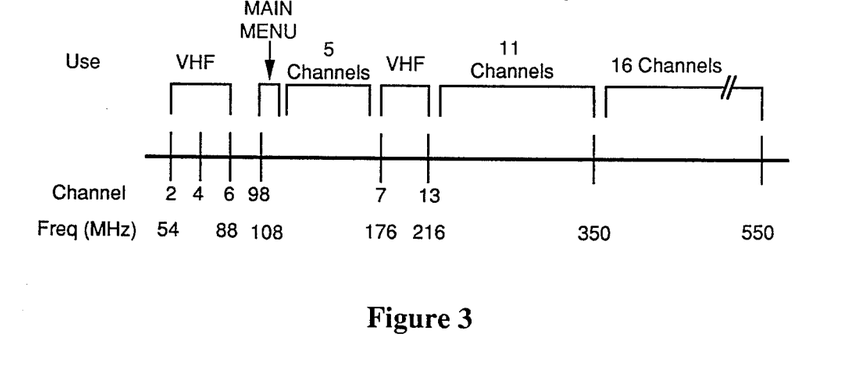
FIG. 3 is a schematic diagram of the frequency distribution of video signals on one branch of video signal distribution system.

In broad terms, the system works as follows. Each cable 110 is frequency multiplexed so that a large number of different programs can be transmitted over each cable. FIG. 3 shows the frequency distribution of video signals on one branch of video signal distribution system.

Standard VHF channels 2 through 6 and 7 through 13, and cable channel 98, occupy their standard positions in the frequency spectrum. Channel 6 is used to transmit the system's "Welcome Menu", and cable channel 98 is used to transmit the system's "Main Menu". The display images for these two menus are stored in screen buffers 117, as shown in FIG. 1.

An additional thirty-two channels, each occupying a frequency band of width 12 Megahertz, are allocated in the remaining portions of the frequency spectrum below 550 Megahertz. For clarity, each of these additional channels will be called a "frequency band" while standard VHF channels will be called "the standard VHF channels".

Each video monitor 102 within a branch of the system (i.e., within a particular group of monitors) has a tuner that is tuned to receive the video signal in a distinct one of the frequency bands. In effect, the transmission cable for each group of video monitors has a separate transmission channel (i.e., frequency band) for each of the monitors in the group.

For any particular monitor, the corresponding frequency band will sometimes be called the "special services channel" for that monitor.

As shown in FIG. 2, there is a remote controller 120 associated with each video monitor 102. The remote controller 120 receives commands from the user of the monitor 102 via a wand 122. The wand 122 emits infrared signals which correspond to the button on the wand which has been pushed, and the remote controller 120 interprets the received signals to determine what action should be taken. The remote controller 120 and wand 122 are similar to the remote controllers in numerous television products as well as video cassette players and many other remotely controlled appliances.

The remote controller 120 performs two sets of functions. First, it controls the tuner (not shown) in the video monitor 102 and thereby selects the channel or frequency band that is received and displayed. In the preferred embodiment, each monitor 102 receives programs on only one of the frequency bands, plus the VHF channels. Therefore the remote controller 120 for any particular video monitor is programmed so that it will only select the VHF channels and the one designated frequency band for that monitor.

Second, the remote controller 120 generates and transmits "video selection requests". Each video selection request contains digital values which denote (1) the associated monitor, (2) the item selected from the menu currently being displayed on the monitor. The video selection request is first encoded by a data modulator 124, and is then transmitted over the cable 110 to the system's control apparatus.

At the input port to the system's control apparatus there is a separate data demodulator 130 for each branch of the system. The demodulators receive and demodulate video selection requests. A buffer 132 temporarily holds video selection requests until they are read in by the controller 116. In the preferred embodiment, the controller 116 is a microcomputer which uses the 80286 microprocessor made by Intel.

Each video monitor 102 is also coupled to a video detector circuit 140 which generates an ON/OFF signal indicating whether any signal is being received by the video monitor 102 on its corresponding frequency band. If the video detector 140 determines that no signal is being received, and the remote controller 120 has received a command from the wand to tune the monitor to the special services channel, the remote controller 120 sends an error message to the controller 116 via the data modulator. The controller 116 is programmed to respond to such error messages by sending a setup signal to the switch apparatus 114 that will cause the unconnected monitor to be coupled to the appropriate video source 112. If the monitor continues not to receive a video signal, as detected by the continued receipt of error messages, the remote controller 120 switches to the Main Menu channel, and a maintenance order is generated and printed out by the central controller 116.

Video selection requests are converted by the controller 116 into on/off commands for selected ones of the audio-visual sources 112, and setup signals that are used by the switch apparatus 114 to couple a specified video source to the cable and frequency band associated with a specified monitor.

In the preferred embodiment, the video sources 112 are video cassette players. The number of video cassette players used in a system will typically vary between thirty-two and ninety, depending on the range of programming variety desired, and the number of copies of the most popular programs which are needed. However, the apparatus of the preferred embodiment will allow virtually any number of video sources to be used.

In addition to video cassette players, the video sources 112 will typically include four to six screen buffers, each storing a distinct display image that can be shown on the video monitors of the system. Each of these screen buffers (which are distinct from the screen buffers 117 shown in FIG. 1) stores a "submenu" which is shown whenever the user selects a corresponding item from the system's Main Menu. An example of the Main Menu is shown in FIG. 8A, and an example of a submenu is shown in FIG. 8B. The Main Menu asks the user to select one of several categories of programs and/or additional services. The submenus stored in the screen buffers list available programs or movies, typically using a separate submenu display for each category of program (such as "action movies", "comedy", "children's movies", and so on). As will be described below, the submenu displays are updated by the controller 116 to reflect the set of currently available programs (i.e., the set of video sources not currently being used by other monitors).

Video Switch

The video switch apparatus 114 includes a two stage crossbar switch 150, and a set of video modulators and combiners 152, both of which will be described in more detail next with reference to FIGS. 4, 5 and 6.

Figure 4:
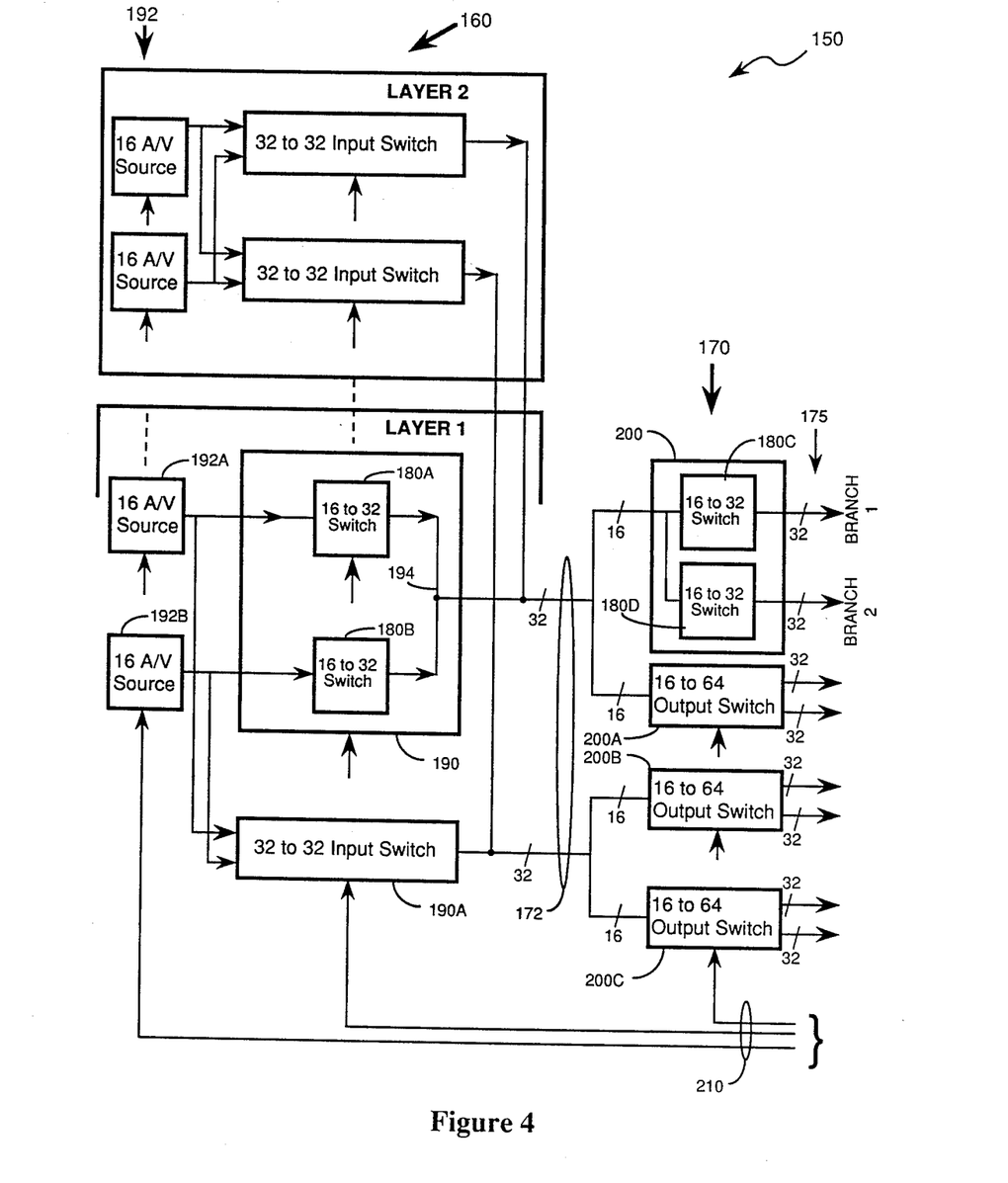
FIG. 4 is a block diagram of the switch circuitry of the preferred embodiment.

As shown in FIG. 4, the video crossbar switch 150 has two stages of circuitry 160 and 170. The first stage 160 couples selected ones of the video sources 192 to an internal set of sixty-four bus lines 172, while the second stage couples the internal bus 172 to a set of two-hundred fifty-six output lines 175. Of course, the exact number of video sources 192 and output lines 175 will vary for each installation of the system.

Figure 5:
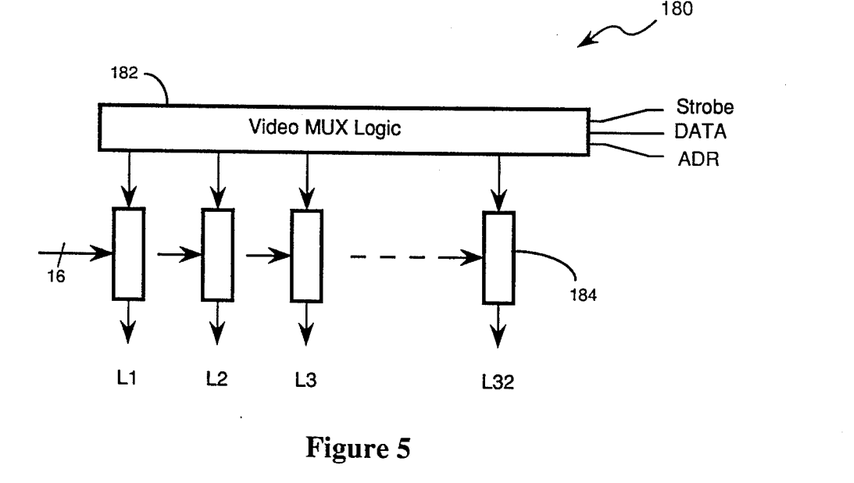
FIG. 5 is a more detailed block diagram of the basic switch building block used to construct the switch circuitry of FIG. 4.

Each of the two stages of the switch are constructed from a basic switch building block 180 that is shown in FIG. 5. The switch building block 180 contains an address decoder 182 and thirty-two analog switches 184, each of which is a 300 Megahertz bandwidth analog video multiplexer switch. In the preferred embodiments, the analog switches 182 are either the DG536 or DG535 analog switch made by Siliconix.

Each analog switch 184 is a wideband analog 16-to-1 multiplexer. The switch 184 has sixteen video input ports, one video output port, and a selection value port. A five bit value, loaded in the selection port, determines which of the sixteen input signals, if any, is to transmitted to the output port. One bit is an enable/disable signal, and the other four bits are an input signal selection value.

The purpose of the decodes 182 is to deliver control signals to specified ones of the analog switches 184. Each setup signal sent to the decoder 182 has three components: (1) an address that specifies which one of the analog switches 184 is being addressed, (2) a data value that is to be sent to the selection port of the addressed analog switch, and (3) a strobe or clock signal which indicates that a new address and data value are ready to be clocked into the circuit. Whenever the strobe signal is enabled, the data on the data line is loaded into the analog switch 182 specified by the signals on the address line.

Thus the basic switch building block 180 can coupled each of sixteen video signals to one or more of thirty-two output lines.

Referring now to FIG. 4, the first stage 160 of the video switch 150 works as follows. Input switch 190 selectively couples thirty-two input lines (i.e., video sources) to thirty-two bus liens on bus 172. Input switch 190 includes two basic switch blocks 180A and 180B. Switch block 180A is connected to a first set of sixteen video sources 192A, and switch block 180B is connected to a second set of sixteen video sources 192B.

The thirty-two output lines 194 from the two switch blocks 180A and 180B are wired together. In other words, each of the thirty-two output lines is coupled to the output of two analog switches 184 — one from each of the basic switch blocks 180A and 180B. Generally, only one of these two analog switch blocks will be enabled at any one time, so that only one video signal will be output onto each bus line on bus 172.

A second input switch 190A selectively couples the same thirty-two video sources 192A and 192B to a second set of thirty-two bus lines. The combination of the two input switches 190 and 190A enables the system to transmit any of the thirty-two video sources to any of the sixty-four bus lines 172. Note that using the above described circuit, any of the video sources can be coupled to two or more of the bus lines. For instance, a video source which stores a menu display image can be transmitted to many of the bus lines.

The above described combination of input switches 190 and 190A, and video sources 192A and 192B, is herein called "LAYER 1" of the first stage of the crossbar switch 150. The reason that it is called a "layer" is that it is easy to increase the number of video sources available to the users of the system simply by duplicating the entire layer, and then coupling (i.e., wiring) the sixty-four outputs of the layers together. As shown in FIG. 4, two layers can be used to enable the use of sixty-four video sources. Similarly, three layers will enable the use of ninety-six video sources, and so on.

An important attribute of the first stage of the crossbar switch is that any of the video sources can be connected to any one of the bus lines.

The second stage of the crossbar switch 150 uses the same basic switch blocks 180, but with different connections. In particular, the second stage of the crossbar switch has several output switches 200, each of which couples sixteen lines from the bus 172 to two branches of the video distribution system with a total of sixty four video monitors.

As shown, each output switch 200 contains two basic switch blocks 180C and 180D. Each basic switch block such as block 180C couples sixteen lines from the bus 172 to the thirty-two lines which will form the connections to Branch 1 of the video distribution system. A second basic switch block 180D couples the same sixteen bus lines to a second branch of the system.

The four output switches 200, 200A, 200B and 200C are each coupled to a distinct set of sixteen bus lines. Together these four output switches generate video signals for an eight branch distribution system with up to two-hundred fifty-six video monitors.

Control lines 210 are used by the controller 116 to (1) send ON/OFF and REWIND signals to the video sources which are video cassette players, and (2) send setup signals to the basic switch blocks in the first and second stages of the switch 150.

In summary, any video source in the system can be coupled to a specified one of the two-hundred fifty-six output lines 175 by using the first stage 160 of the crossbar switch to couple the video source to a selected one of the sixteen bus lines used by the corresponding branch of the system, and then using the second stage 170 of the crossbar switch to couple the selected bus line to the specified output line.

Figure 6:
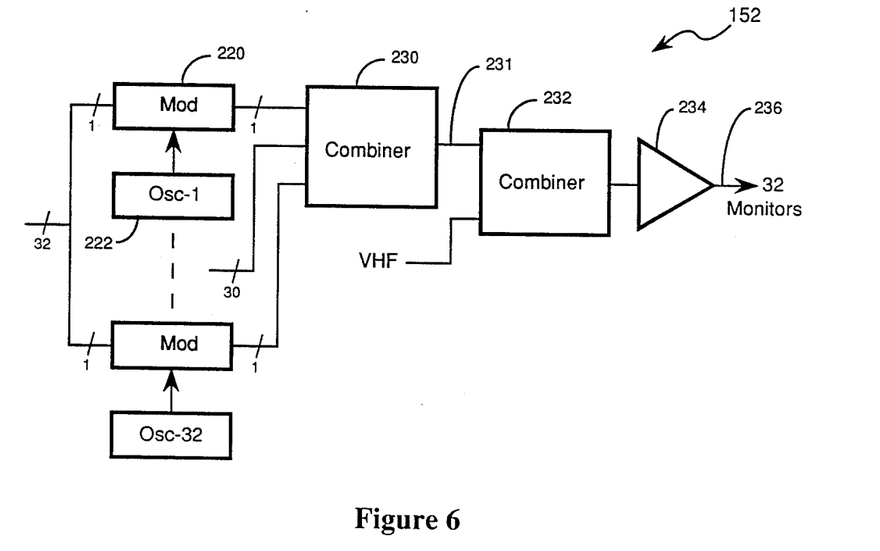
FIG. 6 is a block diagram of the post-switch video modulation and combining circuitry of the preferred embodiment.

Referring to FIG. 6, there is shown a block diagram of the post-switch video modulation and combining circuit 152 which, when coupled to the output of the second stage of the crossbar switch 150, makes the second stage 170 into a frequency multiplexer. The thirty-two input lines shown in FIG. 6 are the thirty-two output lines from one switch block 180C shown in FIG. 4.

Each of these input lines contains a baseband audio/video signal in the same format as a standard television baseband signal. Each of the thirty-two lines is frequency shifted into one of the frequency bands (shown in FIG. 3) by a video modulator 220 and oscillator 222. Thus there are thirty-two modulators and oscillators for frequency shifting thirty-two base band signals. In the preferred embodiment, the modulators are the TDA6800 modulator made by Signetics.

A first video combiner circuit 230 combines the outputs of the thirty-two modulators 220 and outputs a composite signal on line 231. Then a second video combiner circuit 232 combines a composite VHF signal with the signal on line 231, thereby generating a complete composite signal with frequency bands as shown in FIG. 3. The VHF signal includes several channels of video signals, typically occupying the standard frequency ranges for channels 2-6 and 7-13.

Finally, the complete composite signal is amplified by an amplifier 234 and transmitted over a coaxial cable 236 to thirty-two video monitors. The coaxial cable 236 corresponds to one of the transmission cables 110 shown in FIG. 1.

It may be noted that the use of just sixteen bus lines on bus 172 to service sixty four video monitors is based on surveys which show that the peak usage of video movie services in hotels is about 20% — i.e., at most, about 20 per cent of hotel occupants use the movie services in any one day. In addition, not all of that usage is simultaneous, yielding a maximum load at any single one time of less than 20 per cent. If too many users try to order movie services at one time, and thereby overload the system's internal bus 172, an appropriate message display will be sent to the monitors which are unable to order a video program. Note that one of the bus lines in every set of sixteen bus lines is always reserved for "menus". If the system were to become overloaded, the normal menus would temporarily be replaced by a "system too busy" message.

As will be understood by those skilled in the art, it is easy to rearrange the components of the crossbar switch shown in FIG. 4 so as to vary the ratio of bus lines to video monitors. In particular, it would be easy to reduce the ratio to thirty-two monitors per set of sixteen bus lines simply by attaching only one output switch 200 to each set of sixteen bus lines. The number of bus lines can be increased by increments of thirty-two by adding one extra input switch 180 for each set of thirty-two video sources. Therefore a system with two-hundred fifty-six monitors could be serviced with one-hundred twenty-eight bus lines simply by doubling the number of input switches 180, and then coupling the output switches to the bus 172 so that only one output switch 190 is coupled to each set of sixteen bus lines.

For very high usage applications, where it is possible for every video monitor in the system to be simultaneously tuned to a different video source, a full one-to-one ratio of bus lines 172 to video monitors can be achieved. This would be done by changing the wiring of the output switch 200 to be the same as that of the input switch 190: each of the basic switch blocks 180C and 180D in the output switch 200 would be coupled to a different set of sixteen bus lines, and the outputs of the two basic switch blocks would be wired together so as to provide a full 32-to-32 output switch.

User Interface

Figure 7:
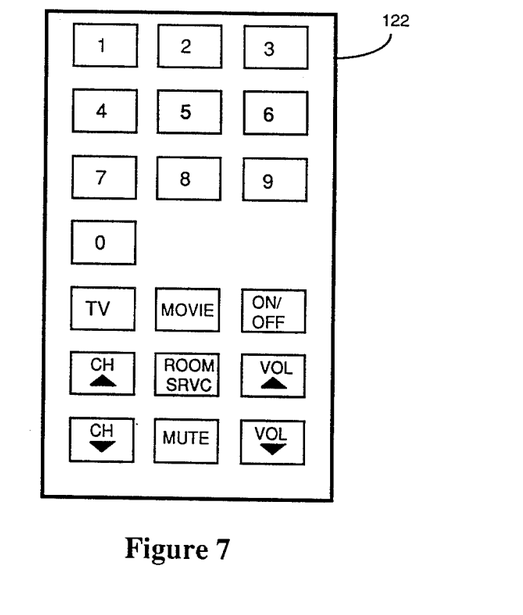
FIG. 7 depicts a preferred embodiment of the keyboard on the remote control wand.
Figure 8:
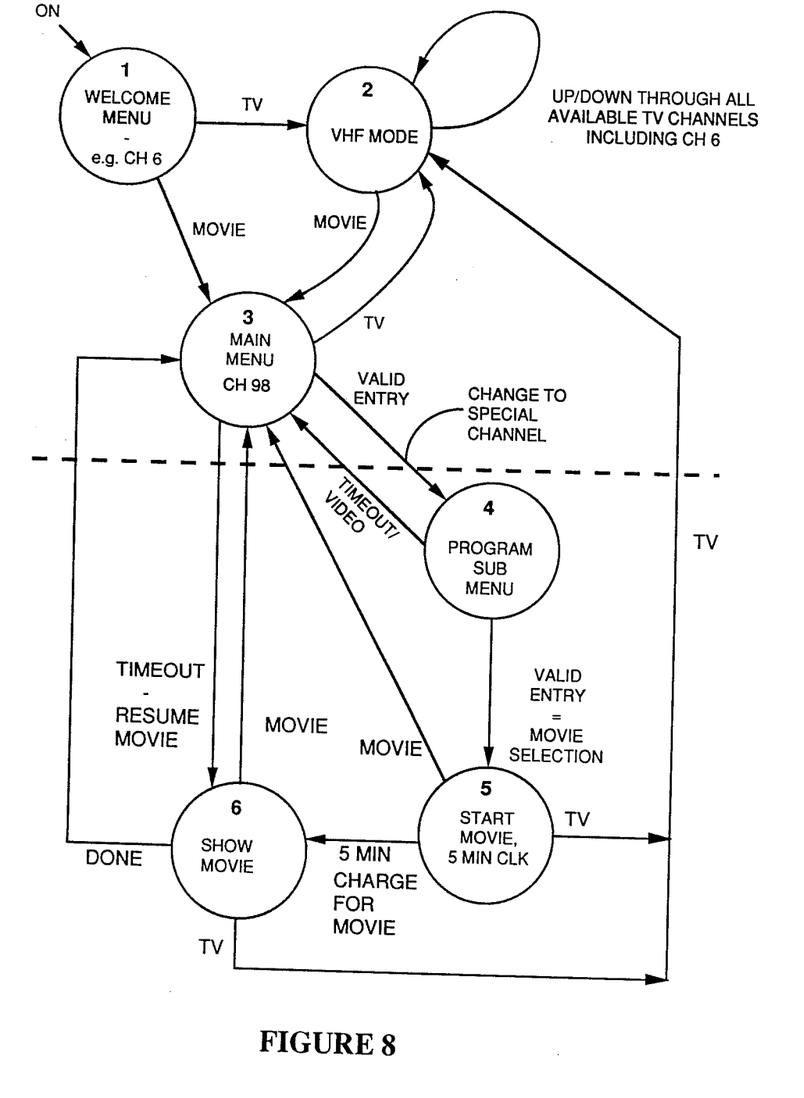
FIG. 8 is a flow chart of the user interaction program for users of the preferred embodiment.
Figure 8A:
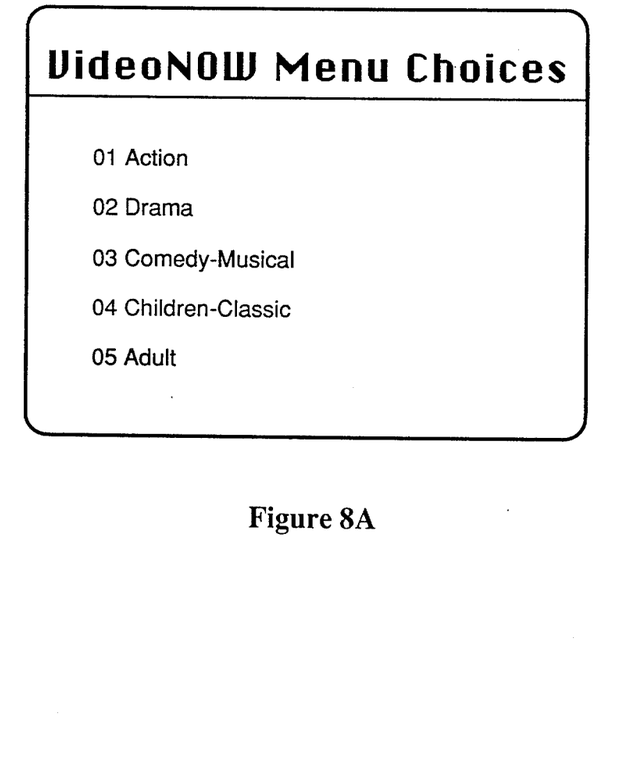
FIGS. 8A–8B schematically show a Main Menu and a Submenu used in the preferred embodiment.
Figure 8B:
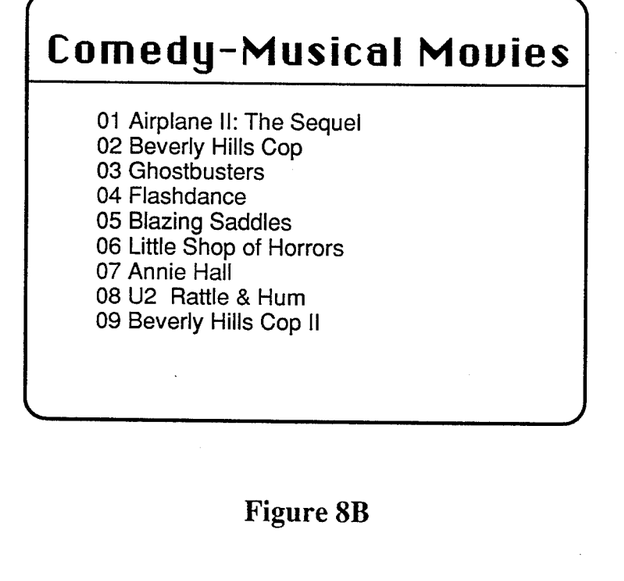

Referring to FIGS. 7 and 8, the user sends commands to the remote controller at a particular video monitor using the wand keyboard shown in FIG. 7. FIG. 8 is a state diagram showing how the system responds the user's commands.

When a remote video monitor is first turned on (by pressing the ON/OFF button) the monitor is tuned to a predefined VHF channel, e.g., channel 6, which always carries the system's "Welcome Menu" (STATE 1 in FIG. 8). The Welcome Menu explains how to use the system. Pressing the TV button leaves the system in VHF mode (STATE 2), from which the user can use the channel UP/DOWN button or the numeric buttons to select any of the available VHF channels. From VHF mode, pressing the MOVIE button causes the monitor to be switched to the Main Menu (STATE 3), which is carried on cable channel 98 in the preferred embodiment.

To continue with the process of selecting a movie, the user must make a valid numerical entry corresponding to one of the submenus (e.g., movie categories) listed in the Main Menu. When a valid entry is made, the remote controller sends a message denoting the user's choice to the system's central controller, and the selected submenu is switched onto the transmission cable and frequency band for the user's monitor, which causes the selected submenu to be displayed (STATE 4). A schematic representation of one submenu in the preferred embodiment is shown in FIG. 8B.

Once the submenu is displayed (STATE 4), if the user fails to make a valid entry within some reasonable period of time (e.g., 30 seconds), the system automatically switches back to the Main Menu (STATE 3).

A valid entry from the submenu means the selection of a program or movie. Once again the remote controller sends a message denoting the user's choice to the system's central controller 116. The central controller then enables the selected video source (i.e., puts the selected video cassette player into play mode), and sets up the crossbar switch 150 so that the selected video source is switched onto the transmission cable and frequency band for the user's monitor, which causes the selected movie or program to be displayed (STATE 5).

If the user does not turn the monitor off, or press the TV or MOVIE buttons for at least five minutes, the central controller's accounting software will typically charge the user for seeing the movie (STATE 6). Note that some video programs may be free of charge, and that in some systems which incorporate the invention it may not be appropriate to charge viewers.

If the TV or MOVIE buttons are pressed within the initial five minutes, the user is returned to a VHF station or the main menu. Note, however, that the previously selected movie is not stopped immediately. If the user proceeds from the Main Menu to select a new movie within a reasonable period of time (e.g., with no periods of inaction of thirty seconds or more), the previously selected movie is cancelled (i.e., rewound and turned off). If the user waits too long, the display of the previously selected movie resumes and the five minute clock for charging the user also resumes. If the movie is exited by using the TV button, the user must choose to return to the movie by using the MOVIE button within a certain period of time (e.g., thirty seconds) or the movie is cancelled.

Once the user has viewed the selected movie for at least five minutes and has been charged (STATE 6), he/she may stop viewing the movie by pressing the TV or MOVIE buttons. As before, the previously selected movie is not stopped immediately. If the user proceeds from the Main Menu to select a new movie or to VHF mode within a reasonable period of time, the previously selected movie is cancelled (i.e., rewound and turned off). If the user waits too long, the display of the previously selected movie resumes.

When the full duration of a movie, preprogrammed into the controller, has elapsed, the central controller 116 sends a REWIND command to the video cassette player. During REWIND the video cassette player does not transmit a video signal. The lack of a video signal is detected by the monitor's video detector 140 (see FIG. 2), which causes the remote controller 120 to switch the monitor's tuner to the main menu channel, resulting in automatic display of the main menu at the end of a movie.

Controller

Figure 9:
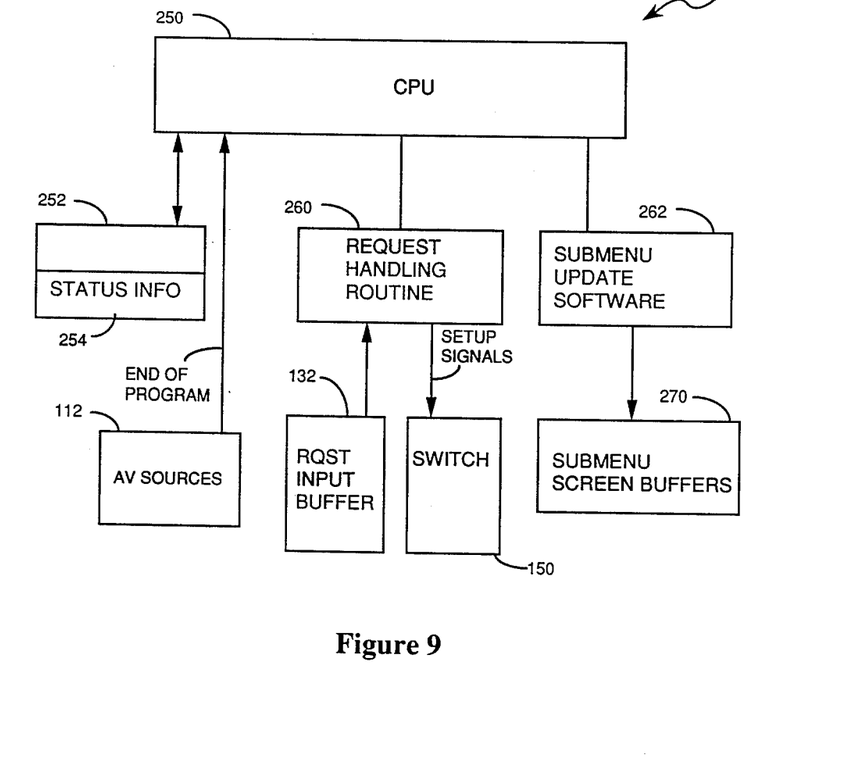
FIG. 9 is a block diagram of the system's controller.

Referring to FIG. 9, the central controller 116 has a CPU 250 which executes a sequence of management programs. Coupled to the CPU 250 is a memory unit 252 which, among other things, stores an array 254 of status information which denotes (1) what video source is coupled to each video monitor, and (2) which video sources are available for use. The memory unit 252 includes both random access memory and secondary, disk storage. Various keyboard consoles and printers (not shown) will also be coupled to the CPU 250 to enable communication with the operators of the system.

A request handling routine 260 analyzes the video selection requests sent by the various video monitors in the system to the controller via the request input buffer 132. This routine 260 converts the requests into ON-/OFF commands for selected ones of the audio-visual sources 112, and setup signals that are transmitted to the crossbar switch 150. As described above, the setup signals cause the crossbar switch 150 to couple a specified video source to the cable and frequency band associated with a specified monitor.

The status information array 254 is updated whenever a valid video selection request for a specified video source is received. In particular, the status information array is updated to denote which movie was selected, the monitor to which it is coupled, the time that the movie began playing, and the projected play-completion time. All changes in the status information array 254 cause the controller CPU 250 to run a "submenu updating routine" 262 which updates the system's submenus in screen buffers 270 to show the currently available video programs.

To determine when the playing of a video cassette tape or disk is complete, the controller's request handling routine contains a table denoting the length of time required to complete each video program. Whenever a program or movie begins playing, the request handling routine 260 stores the starting and projected ending times in the status information array 254. All projected ending times in the status information array are periodically checked (e.g., every second) and when the projected ending time of a movie has been reached, the controller sends a REWIND command to the corresponding video cassette player.

As explained earlier, each video cassette or video disk source 112 is coupled to only one video monitor at a time. There are at least two major reasons for this. One, the premise of the system is that it is an improved movie cassette/disk rental system. The system temporarily provides the specified video monitor with a video cassette player for its own private use, with the advantage that the user can electronically select the program to be viewed instead of having to go somewhere to pick up a video cassette and bring it back to the video monitor.

Second, copyright laws proscribe the public showing of audio-visual works without a license, but allow private rentals of movies on disk and cassette. By allowing only one video monitor to be coupled to a video cassette or disk player at any one time, the system provides only private rentals of each movie cassette and disk. Whenever a viewer rents a movie or other program, it instantly becomes unavailable to other potential viewers. Instead of having a video playback unit next to each monitor, the playback units are located in one central location and are coupled by the system crossbar switch to the system's monitors. Other than the location of the video playback units, and the method of renting video cassettes and disks, the system is equivalent to video cassette/disk rental systems.

To distinguish between video program playback sources 112 and screen buffers 270 (which are also video sources), the status information array 254 stores a "multiple usage allowed flag" for every video source. This flag denotes whether the video source can be coupled to multiple video monitors. In the preferred embodiment, only the screen buffers 270 are denoted as being enabled for multiple viewing. However, in other embodiments, if licenses are obtained for public showing of certain programs (such as an instructional tape that is to be viewed by students in several classrooms), the system's software could easily be modified to allow specially designated video playback units to be coupled to more than one video monitor at a time. It is anticipated that such multiple connections will have to be specially requested by a system operator, and that the connections to the multiple monitors will be made in quick succession so that all the monitors can display the full extent of the shared program.

Alternative Embodiments

It should be noted that the coaxial cables 110 used in the preferred embodiment could be replaced by a number of other transmission media, such as optical fibers. There are many possible alternatives, well known to those skilled in the art, to the arrangement of frequency bands and the particular video switching circuitry used in the preferred embodiment. Similarly, the particular menu setup of the preferred embodiment is illustrative of just one of many possible ways of informing the users at the remotely located terminals of the available programming choices.

The wand 122 shown in FIG. 7 has a "ROOM SRVC" button. It is anticipated that in future embodiments of the invention additional displays and software will be provided for enabling users to order hotel room service, check out, and so on by selecting various service categories from a "main services menu" and then making selections from subsequent menus. The user's choices will be communicated to appropriate routines in the central controller 116, which will then send messages to the hotel's kitchen, or take other actions necessary to carry out the user's orders. As will be understood by those skilled in the art, the apparatus of the present invention provides all the computer and video connection hardware needed for this extension of the present invention. All that needs to be added are additional screen buffers for storing the needed menus, and software for interpreting the user's choices.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A video distribution system for transmitting selected video programs to a number of independently controlled video monitors, comprising:
   a multiplicity of video monitors arranged in a plurality of groups, each said group of video monitors being coupled to a distinct transmission medium;
   a multiplicity of video sources of video signals;
   video switch means responsive to setup signals for coupling specified ones of said video sources to specified ones of said video monitors; said video switch means including frequency multiplexer means coupled to said transmission mediums for transmitting video signals from said specified video sources to the video monitors in each said group in distinct frequency bands on one of said transmission mediums;
   program selection means associated with each said video monitor for generating video connection requests, each said video connection request specifying a video source to be connected to a specified video monitor; and
   each video monitor within each of said groups including tuning means for receiving and displaying the video signal in a distinct one of said frequency bands on the transmission medium coupled to said video monitor; and
   control means, coupled to said video switch means and said program selection means, for receiving said video connection requests, responding to each said video connection request by generating and transmitting corresponding setup signals to said video switch means, and for preventing any of a predefined set of said video sources from being simultaneously connected to two video monitors;
   wherein said video switch means couples specified video sources to specified video monitors by transmitting the video signals from said specified video sources on the transmission mediums and frequency bands corresponding to said specified video monitors;
   said control means including status means for storing information denoting which of said video sources, if any, is coupled to each of said video monitors and for denoting which of said video sources are not coupled to any of said video monitors;
   said control means further including menu generating means coupled to said status means for generating a menu display image representing a set of currently available video sources which are not coupled to any of said video monitors;
   said video switch means including means coupled to said menu generating means for transmitting said menu display image to said video monitors in a predefined frequency band on each of said transmission mediums; and
   each said program selection means including means for generating video connection requests which specify a video source selected from said currently available video sources represented by said menu display image;
   whereby said program selection means cannot generate a video connection request specifying a video source that is already coupled to another one of said video monitors.

2. A video distribution system for transmitting selected video programs to a number of independently controlled video monitors, comprising:
   a multiplicity of video monitors;
   a multiplicity of video sources of video signals;
   video crossbar switch means for simultaneously coupling each video monitor to a specified one of said video sources, said video crossbar switch means responsive to set up signals for connecting specified ones of said video sources to specified ones of said video monitors;
   program selection means associated with each said video monitor for generating video connection requests, each said video connection request specifying a video source to be connected to a specified video monitor; and
   control means, coupled to said video crossbar switch means and said program selection means, for receiving said video connection requests, responding to each said video connection request by generating and transmitting corresponding setup signals to said video crossbar switch means, and for preventing any of a predefined set of said video sources from being simultaneously connected to two video monitors;
   wherein
   said control means includes status means for storing information denoting which of said video sources, if any, is coupled to each of said video monitors and for denoting which of said video sources are not coupled to any of said video monitors;

said control means further including menu generating means coupled to said status means for generating a menu display image representing a set of currently available video sources which are not coupled to any of said video monitors;

said video switch crossbar means including means coupled to said menu generating means for transmitting said menu display image to said video monitors; and said program selection means associated with each said video monitor includes means for generating video connection requests which specify a video source selected from said currently available video sources represented by said menu display image;

whereby said program selection means cannot select a video source that is already coupled to another one of said video monitors.

3. A video distribution system for transmitting selected video programs to a number of independently controlled video monitors, comprising:

a multiplicity of video monitors;

a multiplicity of video sources of video signals;

video crossbar switch means for simultaneously coupling each video monitor to a specified one of said video sources, said video crossbar switch means responsive to setup signals for connecting specified ones of said video sources to specified ones of said video monitors;

program selection means associated with each said video monitor for generating video connection requests, each said video connection request specifying a video source to be connected to a specified video monitor; and control means, coupled to said video crossbar switch means and said program selection means, for receiving said video connection requests, responding to each said video connection request by generating and transmitting corresponding setup signals to said video crossbar switch means, and for preventing any of a predefined set of said video sources from being simultaneously connected to two video monitors;

wherein said video monitors are arranged in a plurality of groups, each said group of video monitors being coupled to a distinct transmission medium;

said video crossbar switch means including a plurality of frequency multiplexing means, each coupled to one of said transmission mediums; each frequency multiplexing means having means for transmitting the video signals from a multiplicity of said video sources in distinct frequency bands on one of said transmission mediums;

each video monitor within each of said groups including tuning means for receiving and displaying the video signal in a distinct one of said frequency bands on the transmission medium coupled to said group of video monitors;

said control means including status means for storing information denoting which of said video sources, if any, is coupled to each of said video monitors and for denoting which of said video sources are not coupled to any of said video monitors;

said control means further including menu generating means coupled to said status means for generating a menu display image representing a set of currently available video sources which are not coupled to any of said video monitors;

said video switch crossbar means including means coupled to said menu generating means for transmitting said menu display image to said video monitors in a predefined frequency band on each of said transmission mediums; and each said program selection means including means for generating video connection requests which specify a video source selected from said currently available video sources represented by said menu display image;

whereby said program selection means cannot generate a video connection request specifying a video source that is already coupled to another one of said video monitors.

4. The video distribution system of claim 3, wherein said video sources include a set of continuous broadcast video signals and also a plurality of limited duration video sources each of which provide a video program having a predefined duration;

said control means further including means coupled to said status means for denoting in said status means the time that each said limited duration video source is coupled to a video monitor and a projected play-completion time, and means for disconnecting each said limited duration video source from the video monitor to which it has been coupled at said projected play-completion time.

5. A video distribution system for transmitting selected video programs to a number of independently controlled video monitors, comprising:

a multiplicity of video monitors;

a multiplicity of video sources of video signals;

video crossbar switch means for simultaneously coupling each video monitor to a specified one of said video sources, said video crossbar switch means responsive to setup signals for connecting specified ones of said video sources to specified ones of said video monitors;

program selection means associated with each said video monitor for generating video connection requests, each said video connection request specifying a video source to be connected to a specified video monitor; and control means, coupled to said video crossbar switch means and said program selection means, for receiving said video connection requests, responding to each said video connection request by generating and transmitting corresponding setup signals to said video crossbar switch means, and for preventing any of a predefined set of said video sources from being simultaneously connected to two video monitors;

wherein a multiplicity of said video monitors are coupled to a common transmission medium;

said video crossbar switch means including frequency multiplexing means for transmitting the video signals from each of a multiplicity of video sources in distinct frequency bands on said common transmission medium;

each of said multiplicity of video monitors including tuning means for receiving and displaying the video signal in a distinct one of said frequency bands on said common transmission medium;

said control means and video crossbar switch means coacting to couple a specified video source to a specified video monitor by transmitting the video signals from said specified video source on a frequency band corresponding to said specified video monitor;

said control means including status means for storing information denoting which of said video sources, if any, is coupled to each of said video monitors and for denoting which of said video sources are not coupled to any of said video monitors;

said control means further including menu generating means coupled to said status means for generating a menu display image representing a set of currently available video sources which are not coupled to any of said video monitors;

said video switch crossbar means including means coupled to said menu generating means for transmitting said menu display image to said video monitors in a predefined frequency band on said transmission medium; and each said program selection means including means for generating video connection requests which specify a video source selected from said currently available video sources represented by said menu display image;

whereby said program selection means cannot generate a video connection request specifying a video source that is already coupled to another one of said video monitors.

6. The video distribution system of claim 5, wherein said video sources include a set of continuous broadcast video signals and also a plurality of limited duration video sources each of which provide a video program having a predefined duration;

said control means further including means coupled to said status means for denoting in said status means the time that each said limited duration video source is coupled to a video monitor and a projected play-completion time, and means for disconnecting each said limited duration video source from the video monitor to which it has been coupled at said projected play-completion time.

7. A method of transmitting selected video programs to a number of independently controlled video monitors, a plurality of distinct groups of said video monitors each being coupled to a distinct transmission medium; said method comprising the steps of:

providing a multiplicity of video sources of video signals;

locally generating, at the site of said video monitors, video connection requests, each said request specifying a video source to be connected to a specified one of said video monitors;

preventing the generation of video connection requests for any of a predefined set of said video sources which are already connected to one of said video monitors;

centrally receiving said video connection requests;

coupling the video source to the video monitor specified in each said request; said coupling step including the step of frequency multiplexing the video signals from a multiplicity of said video sources, and transmitting video signals from said specified video sources to the video monitors in each said group in distinct frequency bands on one of said transmission mediums;

receiving at each said video monitor within each of said groups a distinct one of said frequency bands on the transmission medium coupled to said group of video monitors;

storing information denoting which of said video sources, if any, is coupled to each of said video monitors and denoting which of said video sources are not coupled to any of said video monitors;

generating a menu display image representing a set of currently available video sources which are not coupled to any of said video monitors; and transmitting said menu display image to said video monitors in a predefined frequency band on each of said transmission mediums;

wherein said locally generating step generates video connection requests which specify a video source selected from said currently available video sources represented by said menu display image;

whereby said locally generating step cannot generate a video connection request specifying a video source that is already coupled to another one of said video monitors.

* * * * *